May 12, 1953     W. DE RIDDER     2,638,066
DOUGH MEASURING MACHINE
Filed Dec. 4, 1947     3 Sheets-Sheet 1

Inventor
Willem de Ridder
by C. F. Wenderoth
Atty.

May 12, 1953     W. DE RIDDER     2,638,066
DOUGH MEASURING MACHINE
Filed Dec. 4, 1947     3 Sheets-Sheet 2

Inventor
Willem de Ridder
by C. H. Wenderoth
Atty

May 12, 1953   W. DE RIDDER   2,638,066
DOUGH MEASURING MACHINE
Filed Dec. 4, 1947   3 Sheets-Sheet 3

Inventor
Willem de Ridder
by C. F. Wenderoth
atty

Patented May 12, 1953

2,638,066

UNITED STATES PATENT OFFICE 2,638,066

DOUGH MEASURING MACHINE

Willem de Ridder, The Hague, Netherlands

Application December 4, 1947, Serial No. 789,731
In the Netherlands February 19, 1946

Section 1, Public Law 690, August 8, 1946
Patent expires February 19, 1966

3 Claims. (Cl. 107—15)

Machines for mechanically measuring quantities of bread dough and other dough, ready for further use, are known.

A machine of this kind comprises a dough receptacle under which, in alignment, two dough chambers are arranged and in each of which a piston is reciprocable. One chamber with its piston is used to suck in the dough and press it away, while the other is a measuring chamber provided with a severing member, which together with its piston can be reciprocated. The first mentioned piston is subject to the action of a buffer spring.

This machine has the disadvantage that the measuring chamber and piston are large and heavy and require considerable energy to actuate, and it is difficult to obtain a good sealing. In addition, the measuring chamber requires a separate actuating mechanism. The point where the measured pieces of dough are ejected is not readily accessible, which is additionally objectionable when there is also a device to cut the measured pieces of dough or to separate them, which is customary when it is desired to deliver, for each measurement, two pieces of dough (so-called "halves"). Finally a conveyor belt for delivery of the pieces of dough is required, which conveys the pieces of dough from the ejecting point in the center of the machine to the outside of the machine.

The object of the invention is to provide a dough machine whereby the objections mentioned are wholly or partly obviated.

The machine in accordance with the invention is characterized in that the suction and pressing chamber is simultaneously a measuring chamber, which can be closed off with respect to the vessel by an inlet slide valve, before the outlet slide valve opens. Preferably, according to the invention, a vertical outlet slide valve is reciprocable alongside the outlet of the chamber. In this way a simpler, more compact and cheaper machine can be obtained, in which the dough is not severed or cut off under pressure, but the measured quantity of dough simply can be ejected. A practical embodiment of the new machine is characterized in that the piston and the valves are timed with respect to each other in such a way that first the chamber is fully opened by the inlet valve and the piston, with a closed outlet slide valve, for the admission of dough in excess of the required amount; then the inlet valve starts moving towards the closing position and after that the piston starts its pressing motion; then piston and inlet valve continue to move together in order to press the excess dough away, until the valve closes the chamber with respect to the vessel, the outlet slide valve is moved away and the piston has ejected the measured quantity of dough, after which the inlet valve is moved back; then the outlet slide valve moves to the closing position; and lastly the piston with the inlet valve is also moved back.

In order to adapt this machine for very stiff or elastic types of dough, the inlet valve and the piston are so timed with respect to each other that the inlet valve moves to a position some distance from the closing position and there completely or substantially completely comes to rest, after which the piston starts or continues the pressing movement in order to press away the excess of dough, and then the inlet valve begins to close after the piston comes to rest and the outlet slide valve is opened only when the inlet valve is in closed position, after which the piston presses a measured quantity of dough away.

In order to realize a simple movement of the piston, the inlet valve can be governed, according to the present invention, by a member which also governs the lost motion of the piston. To this end, the piston can be provided with a bar having two carriers between which a part of the actuating member for the inlet valve operates.

By making the lost motion adjustable, the contents of the measuring chamber can be determined in a simple way. To this end, one of the carriers can be fastened adjustably on the piston rod.

An actuating member according to the invention can be used for driving the inlet valve, which is moved by the end of a lever that is supported pivotably at its lower end and carries a pin or roller at an intermediate point which is coupled mechanically with a cam or notch disc that is fastened on a continually turning shaft.

It is also possible for the piston to start its pressing movement before the inlet valve has come to rest.

It is desirable to make the moment at which the piston starts the pressing movement, adjustable.

To control the inlet and the outlet slide valve, according to the invention, continuously rotating discs or cams can be used which control levers or other members for further movement.

The machine can be constructed in such a way that the piston possesses a lost motion, which motion (and thereby the relative lengths of the piston rod) can be adjusted. Other characteristic features of the invention will be evident from the following description, reference being made to the accompanying partly diagrammatic drawings of the invention, after elucidation of the aforesaid known machine by a likewise diagrammatic representation. In the Fig. 1 is a side view of a dough measuring machine of a well known type, with parts in longitudinal section;

Figure 1:
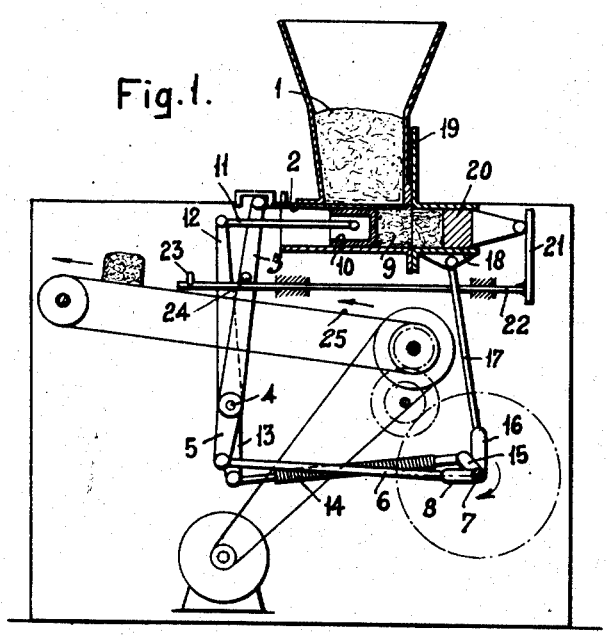

The machine of the known type, illustrated in Fig. 1, consists of a dough receptacle 1, alongside the lower edge of which a knife, which simultaneously functions as the inlet valve 2, can be moved forwards and backwards by means of the arm 3 of a bell crank lever 3—5, pivoted at 4, of which the arm 5 is coupled with a crank 8, fastened to the main shaft 7, by means of a rod 6.

Under the receptacle 1, a space 9 is provided which forms a suction and pressing chamber and in which a piston 10 is reciprocable by means of a rod 11. This rod is coupled with the upper arm 12 of a bell crank lever 12—13, also pivoted at 4, of which the lower arm 13 is connected with a second crank 15, fastened on the main shaft 7, through a long spiral compression spring 14. Mounted on the main shaft 7 is also a third crank 16 which is coupled through a vertical rod 17 to a reciprocable measuring chamber 18, provided with a severing member 19. Reciprocably movable in the measuring chamber 18 is a measuring piston 20, the position of which is determined by an arm 21 of a drawback 22, and an adjustable cam 23 which is carried along by a cam 24 of the lever 3.

Under the measuring chamber 18, a conveyor belt 25 extends which conveys the severed pieces of dough from the center of the machine to the outside.

Of the machine only the parts of interest for this description are shown. The machine operates as follows:

The slide valve 2 and the piston 10 are initially in the forwardmost position, the front wall of the piston being at some distance away (depending upon the sucked-in excess of dough) from the severing member 19 which has been moved downwards. The valve 2 and the piston 10 move backwards, which causes the sucking into the chamber 9 of a quantity of dough which is in excess. Then the valve 2 and piston 10 move forward and the severing member 19 rises in order to bring the measuring chamber 18 in alignment with the chamber 9.

After the valve 2 has closed the measuring chamber on the upper side, the valve 10 moves further forward and presses the dough into the measuring chamber 18, at which time the measuring valve 20 is pressed back against the arm 21. The spring 14 keeps the dough under pressure, while the severing member moves downward with the measuring chamber 18 and cuts off the desired quantity of dough from the mass. The measuring chamber is now filled with the measured quantity of dough and, after the chamber has been moved downward to a sufficient extent, this quantity of dough is pressed out of the measuring chamber by the measuring valve 20. The piece of dough drops onto the conveyor belt 25. The valve 2 and the piston 10 then move backward again for the following cycle of movements, after which the severing member 19 moves upwardly again so to close the chamber 9. At the ejection point a knife can be arranged which divides the delivered piece of dough in a vertical plane into two halves which then fall onto the conveyor belt.

The machine according to the present invention, as shown in Figures 2–6, is constructed as follows:

Under the receptacle 1, a combined suction, pressing and measuring chamber 26 is situated in which a piston 27 can be moved by means of a rod 11. The said measuring chamber is separated from the receptacle by an inlet slide valve 2 which simultaneously functions as a cutting knife and is moved by the upper end of an arm 28. This arm is journaled on a shaft 29 and, at some distance above its lower end, carries a pin 30 which is governed mechanically by a notch disc 31 or cam, fastened on the shaft 7 (for the sake of simplicity only one such cam has been shown).

Near its upper end, the arm 28 carries a pin 32 which is positioned between two stops 33, 34, fastened adjustably on the piston rod 11.

Figure 3:
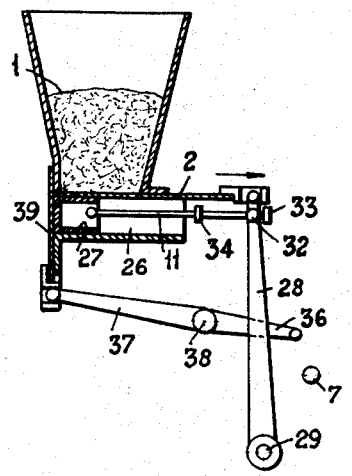
Fig. 3 is a view corresponding to Fig. 2, but with the outlet slide valve moved into the closing position.
Figure 4:
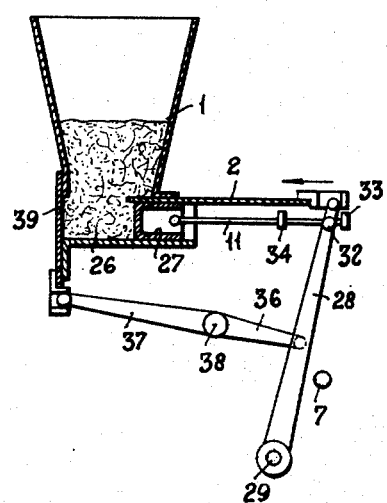
Fig. 4 is a view corresponding to Fig. 2, but with the inlet valve and the piston completely withdrawn.

On the shaft 7 there is also a second notch disc or cam 35 which controls the movement of the end of the arm 36 of a horizontal rocking lever 36, 37 that can be rocked about a shaft 38. The end of the arm 37 is coupled with an outlet slide valve 39, reciprocable alongside the front of the piston and the receptacle. The machine as illustrated functions as follows (Figs. 2–6):

If the inlet valve 2 and the piston 27 are moved back, the outlet slide valve 39 being raised, dough is sucked from the receptacle 1 into the chamber 26 which is a combined suction, pressing and measuring chamber (Figs. 3 and 4).

Upon movement of the arm 28, the inlet valve is first moved back and then the outlet slide valve is lifted. As soon as the carrier 32 touches the stop 33, the piston 27 is also carried along until the position according to Fig. 4 is reached.

Thereupon the arm 28 is moved in the opposite direction, at which time the inlet valve 2 goes forward and then when the pin 32 has reached the stop 34, the piston is carried forward.

Figure 2:
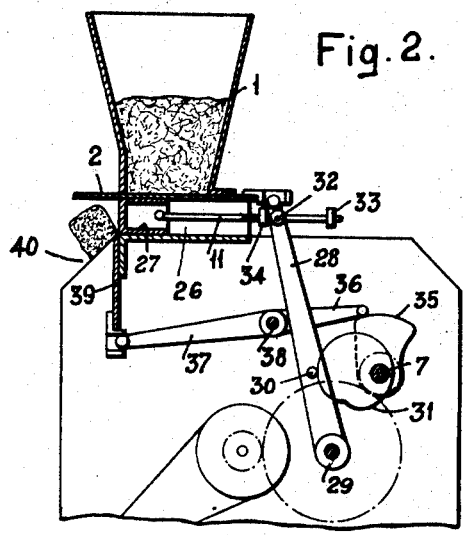
Fig. 2 is a corresponding view of a dough measuring machine in accordance with the present invention, in the initial position which is also the ejection position.
Figure 5:
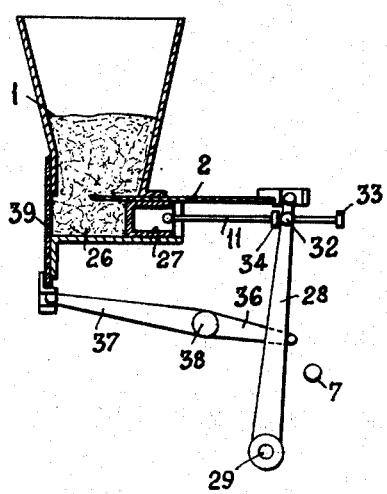
Fig. 5 is a view corresponding to Fig. 4, but with the inlet valve moved some distance forward.
Figure 6:
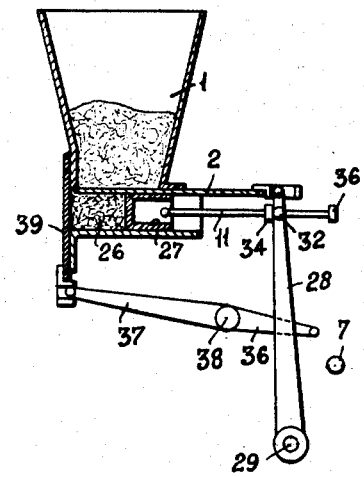
Fig. 6 is a view corresponding to Fig. 5, but with the inlet valve moved all the way forward, the measuring chamber containing the measured quantity of dough, immediately before the outlet slide valve begins to move downward.

Herewith the dough in the chamber 26 is separated from the dough in the receptacle 1 and the excess is pressed back from this chamber into the receptacle (Figs. 5, 6). As soon as the position according to Fig. 6 is attained, the piston does not move any farther and the outlet slide valve 6 is pulled downward. After this valve has fully unblocked the outlet of the chamber 26, the piston is moved farther forward and the measured piece of dough is ejected (Fig. 2). In contradistinction to the described known machine, a dough measuring machine according to the present invention has only one dough chamber and in this chamber not only are the suction and pressing effected, but also the measuring, so that a single piston is sufficient. This obviates the necessity of reciprocating a heavy unit consisting of a separate measuring chamber with piston, and the cutting off of a quantity of dough need not be effected while the latter is under spring pressure. Furthermore the piston can be controlled by the actuating lever for the inlet valve, as a result of which the machine is even more simplified. The whole machine can be lighter in weight and of smaller circumference. The use of a pressure spring in the driving mechanism for the piston is superfluous. The new machine can easily be erected adjacent the machine for further handling of the dough without a conveyor belt being required, as the pieces of dough are not ejected in the center of the machine but on the outside.

By adjusting the stop 34, the quantity of dough to be measured can be adjusted, since the distance between the front of the valve and that of the piston is determined by this adjustment. The measured piece of dough is ejected with the new machine at point 40, which is far more accessible than the point of ejection of the known machine. This is very important because, when cutting the pieces of dough, disturbances have to be taken into account.

Figure 7:
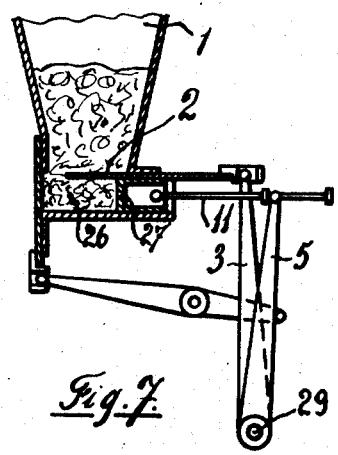
Fig. 7 is a diagrammatic drawing in accordance with the invention in which the inlet valve has come to a standstill and the piston starts the pressing movement.
Figure 8:
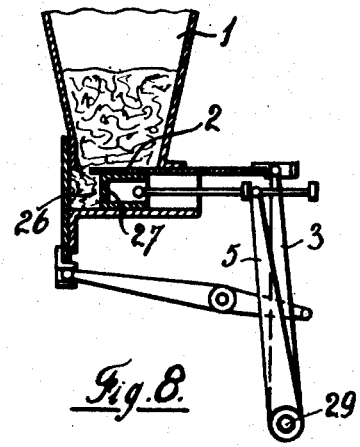
Fig. 8 shows the same machine, with the piston at the end of its pressing movement and the inlet valve about to close.
Figure 9:
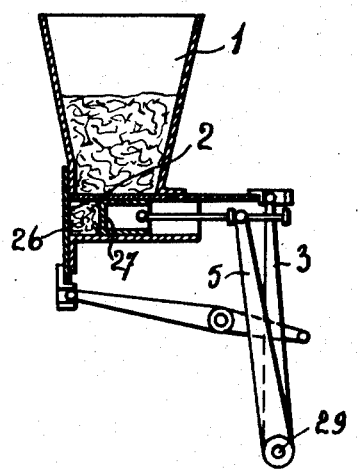
Fig. 9 shows the position in which the inlet valve is closed and the outlet slide valve is about to open.

In a special construction of the machine, shown in Figs. 7, 8 and 9, a combined suction, pressing and measuring chamber 26, in which a piston 27 can be moved by means of a rod 11, is positioned under receptacle 1. The chamber 26 is separated from the receptacle 1 by an inlet valve 2, which also functions as a cutting knife, and is moved by the upper end of an arm 3 which pivots at its lower end about a shaft 29.

Figure 10:
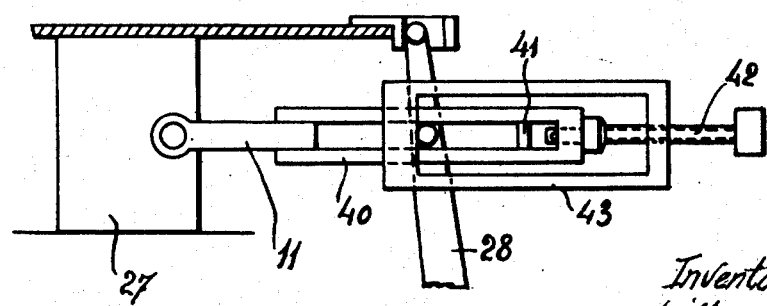
Fig. 10 is a schematic view of the adjusting mechanism.

The operation of this embodiment is as follows:

The inlet valve 2 moves to the position shown in Fig. 7. Substantially at that time the piston 27 starts the pressing movement and comes into the position shown in Fig. 8. During this movement the piston presses the excess of dough back into the receptacle 1. The inlet valve 2 starts to move again and closes the pressing chamber 26 (see Fig. 9). The outlet valve now opens, and the piston 27 presses the measured quantity of dough out of the measuring chamber 26. For adjusting the piston movement a slotted member may be fixed on the piston rod 11 (Fig. 10). This member is provided with a fixed stop 41. At the end of the slotted member, a spindle 42 is rotatably mounted. This spindle is provided with screw threads with which a frame-shaped stop 43 is adjustable. By means of this adjustable stop, the relative length of the piston rod is also adjustable.

Due to the above-mentioned means, the machine is extraordinarily suitable for stiff and/or elastic types of dough.

As the moving measuring chamber is dispensed with, the machine is also simpler and more economical in supervision and maintenance, and any baker can fix the quantity of dough to be measured in a simple way and quickly.

If desired in the new machine one or more distributing knives or a double or multiple measuring chamber can be used for the simultaneous delivery of two or more pieces of dough.

The invention obviously is not limited to the described embodiments, but also covers equivalent constructions, variations and improvements thereof within the scope of the appended claims.

Though the machine according to the invention is designed and constructed for the measuring of dough, it may be used for the measuring of other plastic substances.

I claim:

1. In a dough measuring machine, a dough receptacle having an outlet therefrom, a suction pressing and measuring chamber in communication with said opening in said receptacle, a piston slidably arranged in said chamber, an inlet valve slidably arranged between said receptacle and said chamber, an outlet valve slidably arranged at an end of said chamber, actuating means for said piston and said inlet and outlet valves, timing means for said actuating means, and lost motion means incorporated in said actuating means for said piston whereby said inlet valve is actuatable both in an opening and closing direction prior to actuation of said piston.

2. In a dough measuring machine, a dough receptacle having an outlet therefrom, a suction pressing and measuring chamber in communication with said opening in said receptacle, a piston slidably arranged in said chamber, an inlet valve slidably arranged between said receptacle and said chamber, an outlet valve slidably arranged at an end of said chamber, actuating means for said piston and said inlet and outlet valves, timing means for said actuating means, said actuating means for said piston and said inlet valve comprising a rod secured to said piston, stationary stop means adjacent the free end of said rod and adjustable stop means on said rod between said stationary stop and said piston, a main shaft for said machine, a first cam on said main shaft, a second shaft in said machine, an arm rotatably journalled on said second shaft and secured to said inlet valve, a pin member on said arm coacting with said first cam for regulating the movement of said arm, a second pin on said arm coacting with said stop means on said rod secured to said piston, said stops on said rod being spaced apart and providing lost motion means in said timing means whereby said inlet valve is actuatable both in an opening and closing direction prior to actuation of said piston.

3. In a dough measuring machine as claimed in claim 2, said outlet valve actuating means comprising a second cam on said main shaft, a third shaft in said machine, an arm rotatably journalled on said third shaft internally of the ends of said arm, an end of said arm being secured to said outlet valve, the other end of said arm coacting with said second cam for actuation of said outlet valve.

WILLEM DE RIDDER.

References Cited in the file of this patent

UNITED STATES PATENTS

| Number | Name | Date |
|--------|------|------|
| 1,277,405 | Geyer | Sept. 3, 1918 |
| 1,513,157 | Calyton | Oct. 28, 1924 |
| 1,704,903 | Russell | Mar. 12, 1929 |
| 2,280,834 | Kocher | Apr. 28, 1942 |

FOREIGN PATENTS

| Number | Country | Date |
|--------|---------|------|
| 64,649 | Netherlands | Oct. 15, 1949 |